United States Patent
Kawamura et al.

(10) Patent No.: US 10,661,822 B2
(45) Date of Patent: May 26, 2020

(54) WORM REDUCER AND ELECTRIC POWER STEERING SYSTEM

(71) Applicant: JTEKT CORPORATION, Osaka-shi, Osaka (JP)

(72) Inventors: Naofumi Kawamura, Kishiwada (JP); Hirofumi Ueda, Shiki-gun (JP); Kaname Joushita, Toyota (JP)

(73) Assignee: JTEKT CORPORATION, Osaka (JP)

(*) Notice: Subject to any disclaimer, the term of this patent is extended or adjusted under 35 U.S.C. 154(b) by 159 days.

(21) Appl. No.: 15/951,532

(22) Filed: Apr. 12, 2018

(65) Prior Publication Data

US 2018/0304915 A1  Oct. 25, 2018

(30) Foreign Application Priority Data

Apr. 19, 2017 (JP) .................... 2017-082913

(51) Int. Cl.
*B62D 3/10* (2006.01)
*B62D 5/04* (2006.01)
(Continued)

(52) U.S. Cl.
CPC ............ *B62D 3/10* (2013.01); *B62D 5/0403* (2013.01); *B62D 5/0409* (2013.01); *F16C 27/04* (2013.01);
(Continued)

(58) Field of Classification Search
None
See application file for complete search history.

(56) References Cited

U.S. PATENT DOCUMENTS 4,967,858 A * 11/1990 Kotake ................ B62D 5/0409
180/444
6,357,313 B1 * 3/2002 Appleyard ........... B62D 5/0409
74/388 PS
(Continued)

FOREIGN PATENT DOCUMENTS

EP  2 689 988 A2  1/2014
EP  3 088 277 A1  11/2016
(Continued)

OTHER PUBLICATIONS

Oct. 5, 2018 Extended Search Report issued in European Patent Application No. 18167502.6.

*Primary Examiner* — Drew J Brown
(74) *Attorney, Agent, or Firm* — Oliff PLC (57) ABSTRACT

A first end portion of a worm shaft and a first bearing that supports the first end portion are housed in a first end housing portion in a housing. The first end portion is urged toward a worm wheel by an urging member. A rotation regulation portion housing recess is formed in a portion that defines the first end housing portion on an inner surface of the housing. An elastic member includes an arc-shaped buffer portion that is interposed between the portion that defines the inner surface and an outer peripheral surface of the first bearing, and a rotation regulation portion that extends from the buffer portion and is housed in the rotation regulation portion housing recess. The rotation regulation portion includes a hollow portion which suppresses load transmission from the rotation regulation portion to the buffer portion during rotation regulation.

6 Claims, 9 Drawing Sheets

(51) Int. Cl.
  *F16H 55/24* (2006.01)
  *F16C 27/04* (2006.01)
  *F16C 27/06* (2006.01)
  *F16H 1/16* (2006.01)

(52) U.S. Cl.
  CPC ............... *F16C 27/06* (2013.01); *F16H 1/16* (2013.01); *F16H 55/24* (2013.01); *F16C 2326/24* (2013.01)

(56) References Cited

U.S. PATENT DOCUMENTS

| | | | | |
|---|---|---|---|---|
| 10,053,139 | B2* | 8/2018 | Schonlechner | F16H 19/001 |
| 2005/0235768 | A1* | 10/2005 | Shimizu | B62D 5/0409 74/425 |
| 2012/0077605 | A1* | 3/2012 | Nakagaito | F16D 3/12 464/68.8 |
| 2012/0111657 | A1* | 5/2012 | Hamakita | B62D 5/0409 180/444 |
| 2013/0075189 | A1* | 3/2013 | Sekikawa | B62D 5/0409 180/444 |
| 2014/0008142 | A1* | 1/2014 | Yoshikawa | B62D 5/0409 180/444 |
| 2015/0276047 | A1* | 10/2015 | Kimijima | F16H 1/16 74/409 |
| 2015/0336603 | A1 | 11/2015 | Yoshikawa et al. | |
| 2016/0010740 | A1* | 1/2016 | Yamauchi | F16H 55/24 74/409 |
| 2016/0069423 | A1* | 3/2016 | Hamakita | B62D 5/0409 74/425 |
| 2016/0318544 | A1* | 11/2016 | Kawamura | F16H 57/12 |
| 2016/0319906 | A1* | 11/2016 | Kawamura | F16H 57/12 |

FOREIGN PATENT DOCUMENTS

| | | |
|---|---|---|
| GB | 2528517 A | 1/2016 |
| JP | 2013-155789 A | 8/2013 |
| JP | 2014-125113 A | 7/2014 |

* cited by examiner

WORM WHEEL SIDE

WORM WHEEL SIDE

WORM REDUCER AND ELECTRIC POWER STEERING SYSTEM

INCORPORATION BY REFERENCE

The disclosure of Japanese Patent Application No. 2017-082913 filed on Apr. 19, 2017 including the specification, drawings and abstract, is incorporated herein by reference in its entirety.

BACKGROUND OF THE INVENTION

1. Field of the Invention

The invention relates to a worm reducer and an electric power steering system.

2. Description of Related Art

In a worm shaft of an electric power steering system that transmits rotation output of an electric motor to a steering shaft, backlash occurs between the worm shaft and a worm wheel. The worm shaft has an end that is drivingly coupled to the electric motor and the worm wheel is coupled to the steering shaft. In a conventionally known structure, the other end of the worm shaft is urged toward the worm wheel by an urging member via a bearing, in order to suppress the backlash.

A technology has been proposed, in which a striking noise due to contact between a housing that houses the worm shaft and the bearing is suppressed, by absorbing load that acts on the bearing through the worm shaft from the worm wheel side. For example, in Japanese Patent Application Publication No. 2014-125113 (2014-125113 A), an inner peripheral surface of a gear case (housing) and an outer peripheral surface of a bearing face each other across a prescribed clearance. An annular elastic portion that extends along the whole circumference of the outer peripheral surface of the bearing is interposed between an annular groove provided on the inner peripheral surface of the gear case and the outer peripheral surface of the bearing. Thus, the striking noise due to contact of the bearing and the housing is suppressed.

The direction of the load that acts on the bearing via the worm shaft due to a meshing reaction force of the worm shaft and the worm wheel during assistance, is determined by the gear specifications. If an arc-shaped elastic portion is used, which extends in a range including the direction in which the load acts, it will be necessary to regulate the position so that the elastic portion does not rotate in the circumferential direction of the bearing. In Japanese Patent Application Publication No. 2013-155789 (JP 2013-155789 A), a resin bearing holder is used. The bearing holder interposes an arc-shaped body portion between an outer peripheral surface of a bearing and an inner peripheral surface of a housing. In this bearing holder, a solid positioning protrusion that protrudes radially outward from the arc-shaped body portion is housed in a recess of the inner peripheral surface of the housing. By engaging the solid positioning protrusion with a pair of inner wall surfaces of the recess, the rotation of the body portion of the bearing holder in the circumferential direction can be regulated.

When regulating the rotation of the arc-shaped elastic portion with the solid positioning protrusion that protrudes radially outward from the arc-shaped elastic portion, for disposing the arc-shaped elastic portion around the bearing, as in JP 2013-155789 A, the following malfunctions can be expected to occur. With rotation regulation of the elastic portion, the solid positioning protrusion engages with the inner wall surfaces of the recess of the housing and deforms. Deformation load is then applied to the arc-shaped elastic portion. Thus, the arc-shaped elastic portion deforms and can no longer sufficiently attenuate the movement of the bearing, and there is a risk of a striking noise due to contact being generated.

SUMMARY OF THE INVENTION

An object of the invention is to provide a low-noise worm reducer and an electric power steering system.

According to an aspect of the invention, the worm reducer includes: a worm shaft that has a first end portion and a second end portion in an axial direction of the worm shaft, the second end portion coupled to an electric motor; a worm wheel that meshes with the worm shaft; a bearing that supports the first end portion of the worm shaft; a housing including an inner surface having a portion that defines a first end housing portion that houses the first end portion of the worm shaft and the bearing, the portion of the inner surface provided with a recess having a pair of inner wall surfaces that face each other in a circumferential direction of the bearing; an urging member that urges the first end portion of the worm shaft toward the worm wheel via the bearing; and an elastic member including an arc-shaped buffer portion that is interposed between the portion of the inner surface of the housing and an outer peripheral surface of the bearing and that opens toward the worm wheel, and a rotation regulation portion that extends from the buffer portion and is housed in the recess and that regulates the buffer portion from rotating in the circumferential direction by engaging with the inner wall surfaces. The rotation regulation portion includes a hollow portion which suppresses load transmission from the rotation regulation portion to the buffer portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
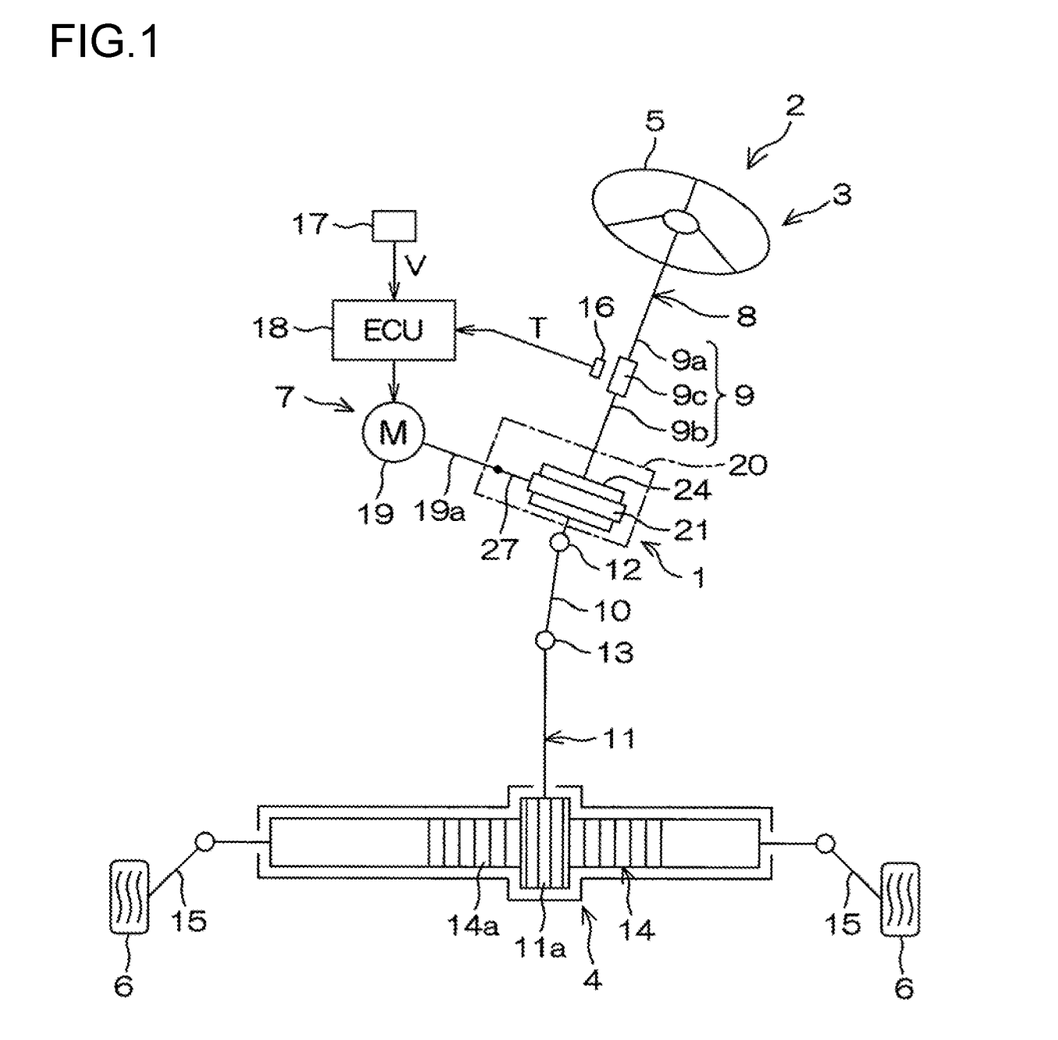
FIG. 1 is a schematic diagram of an electric power steering system to which a worm reducer of the first embodiment of the invention is applied.

Hereinafter, embodiments of the invention will be described with reference to the accompanying drawings. FIG. 1 is a schematic diagram of an electric power steering system 2 to which a worm reducer 1 of the first embodiment of the invention is applied. With reference to FIG. 1, the electric power steering system 2 has a steering mechanism 3 and a steering operation mechanism 4. The electric power steering system 2 turns steered wheels 6 based on the operation of a steering wheel 5 (steering member) by a driver. The steering mechanism 3 has an assist mechanism 7 that assists the operation of the steering wheel 5 by the driver.

The steering mechanism 3 includes a steering shaft 8 that rotates in association with the rotation of the steering wheel 5. The steering shaft 8 includes a column shaft 9, an intermediate shaft 10, and a pinion shaft 11. The column shaft 9 includes an input shaft 9a, an output shaft 9b, and a torsion bar 9c. The input shaft 9a is coupled to the steering wheel 5. The output shaft 9b is coupled to the intermediate shaft 10. The torsion bar 9c is coaxially coupled to the input shaft 9a and the output shaft 9b.

The output shaft 9b is coupled to the intermediate shaft 10 via a universal joint 12. The intermediate shaft 10 is coupled to the pinion shaft 11 via a universal joint 13. A pinion 11a is formed on the pinion shaft 11. The steering operation mechanism 4 has a rack shaft 14 and tie rods 15. A rack 14a that meshes with the pinion 11a is formed on the rack shaft 14. One end of each tie rod 15 is coupled to the rack shaft 14, and the other end is coupled to a corresponding one of the steered wheels 6.

When the steering wheel 5 rotates according to the operation of the steering wheel 5 by the driver, the pinion shaft 11 rotates via the column shaft 9 and the intermediate shaft 10. The rotation of the pinion shaft 11 is converted to a reciprocating motion in the axial direction of the rack shaft 14 by a rack and pinion mechanism. The reciprocating motion of the rack shaft 14 changes the turning angle of the steered wheels 6.

The assist mechanism 7 has a torque sensor 16, a vehicle speed sensor 17, an electronic control unit (ECU) 18, an electric motor 19, and the worm reducer 1. The torque sensor 16 detects a steering torque T based on a torsion amount between the input shaft 9a and the output shaft 9b. The ECU 18 determines an assist torque based on the steering torque T detected by the torque sensor 16 and a vehicle speed V detected by the vehicle speed sensor 17. Driving of the electric motor 19 is controlled by the ECU 18. The rotational force (power) of the electric motor 19 is transmitted to the output shaft 9b of the column shaft 9 of the steering shaft 8 via the worm reducer 1. As a result, the assist torque is applied to the output shaft 9b and the steering operation of the driver is assisted.

Figure 2:
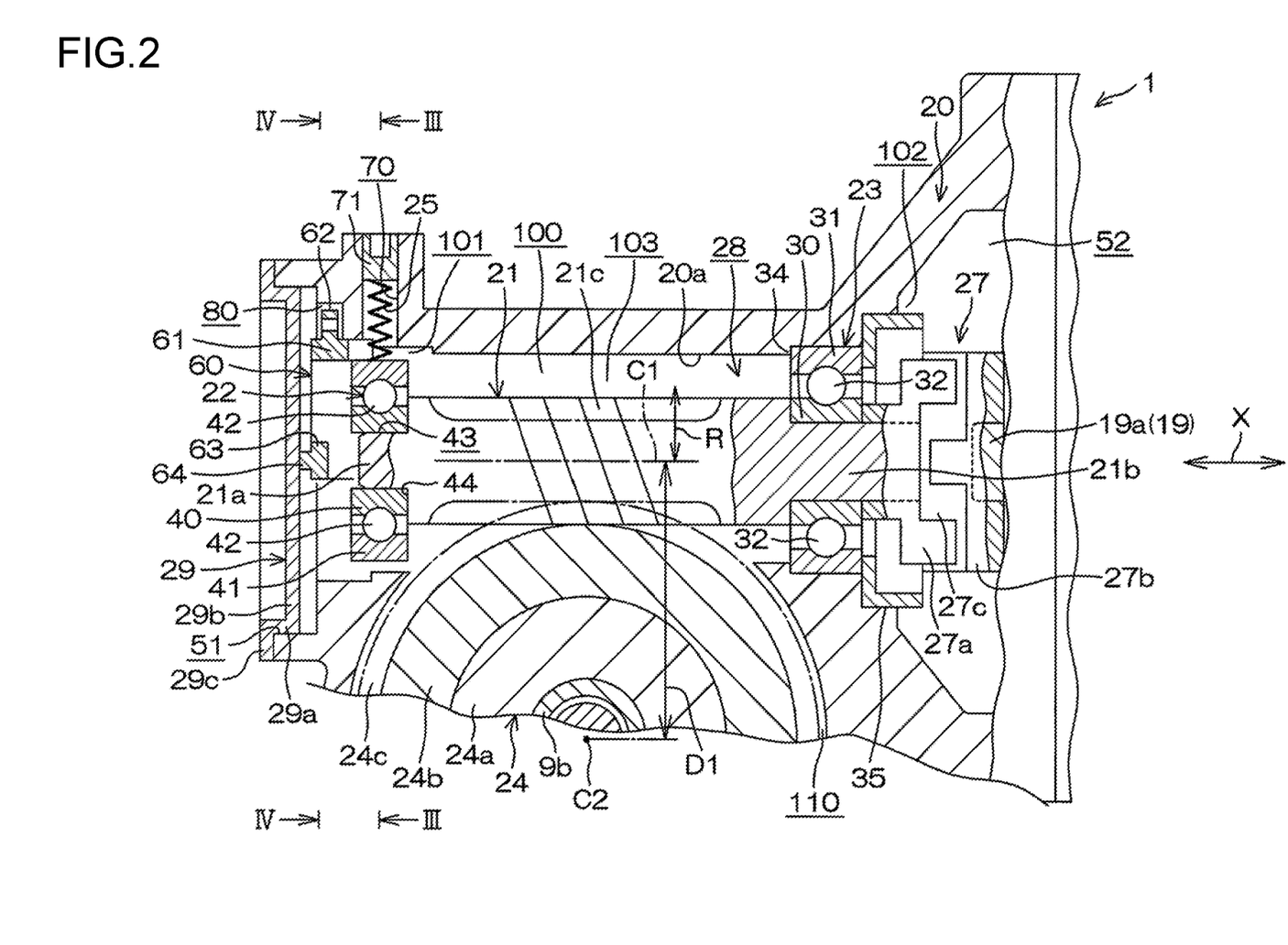
FIG. 2 is a sectional view of a main part of the worm reducer.
Figure 3:
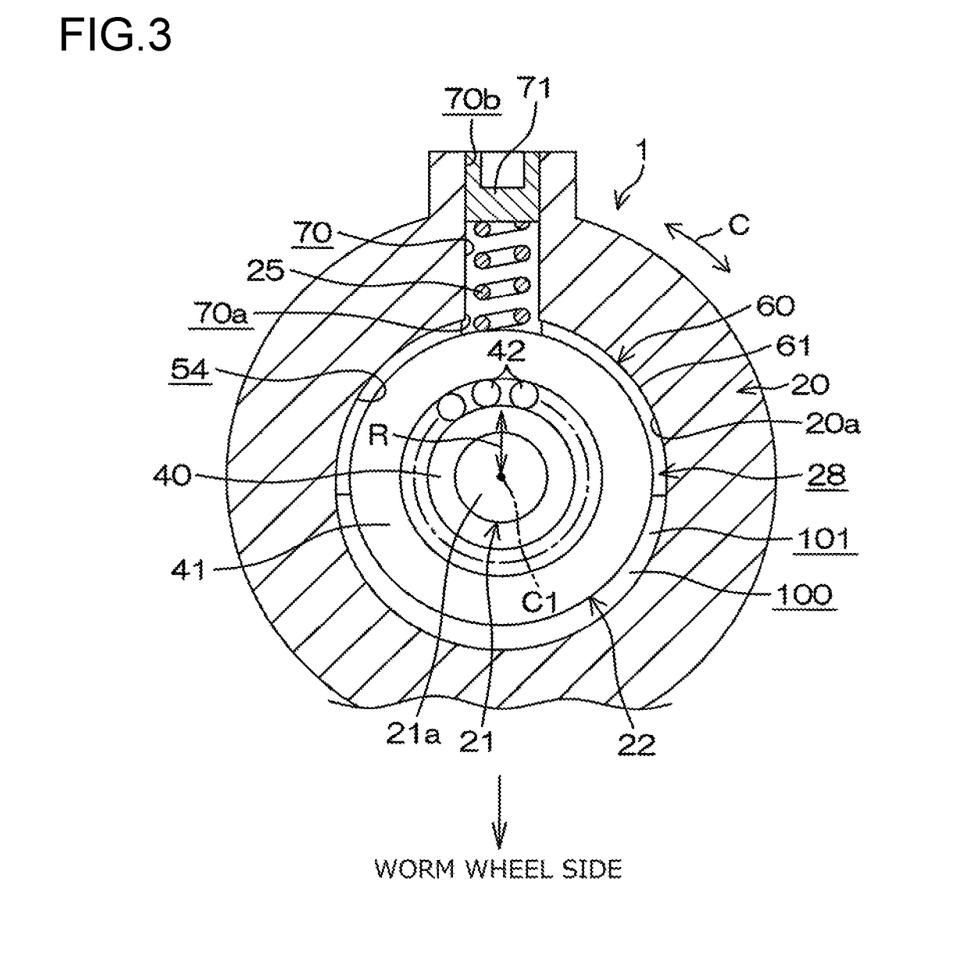
FIG. 3 is a schematic cross-sectional view taken along line III-III in FIG. 2.
Figure 4:
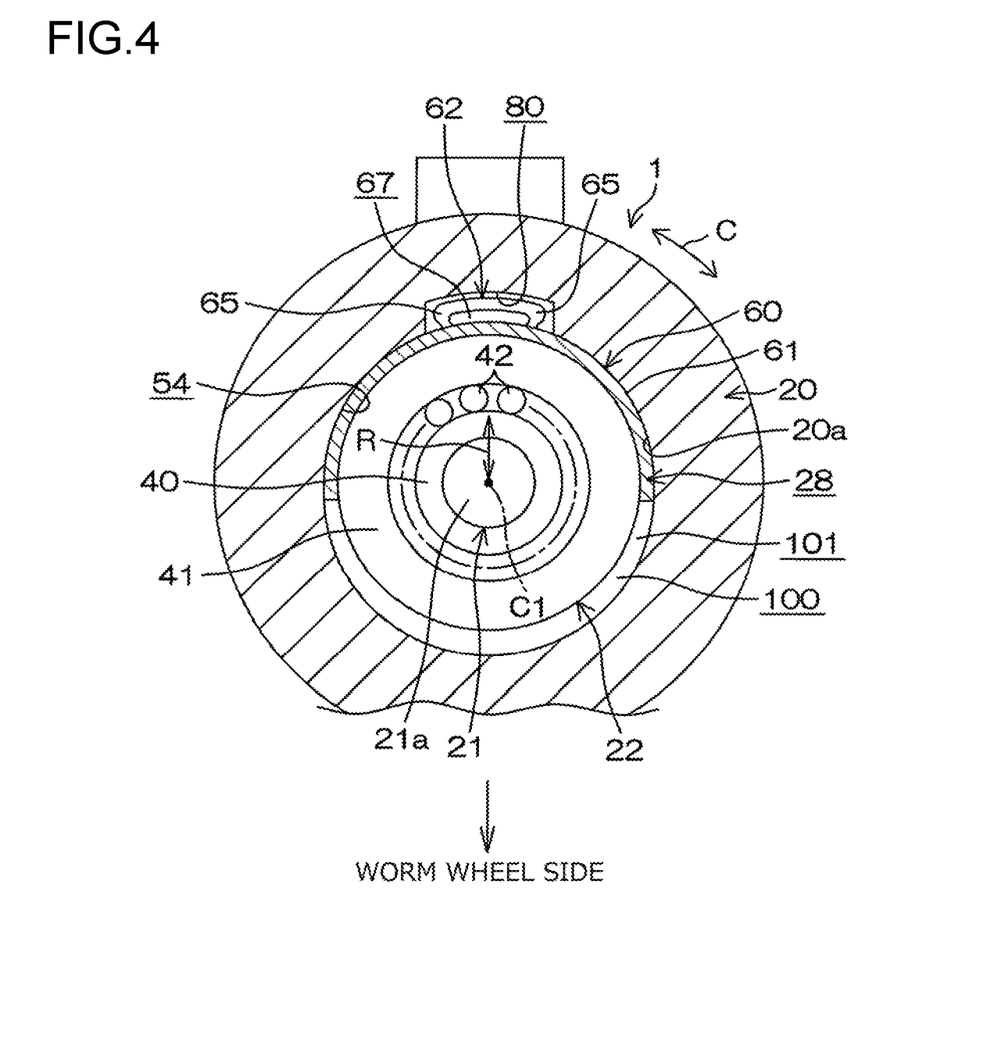
FIG. 4 is a schematic cross-sectional view taken along line IV-IV in FIG. 2.

In the embodiment, an electric power steering system, in which power from the electric motor 19 is applied to the column shaft 9, will be described as an example. However, the invention is not limited to this, and can be applied to the electric power steering system that has a worm reducer. Next, the structure of the worm reducer 1 will be described. FIG. 2 is a sectional view of a main part of the worm reducer 1. FIG. 3 is a schematic cross-sectional view taken along line III-III in FIG. 2. FIG. 4 is a schematic cross-sectional view taken along line IV-IV in FIG. 2.

Referring to FIG. 2, the worm reducer 1 includes a housing 20, a worm shaft 21, a first bearing 22, a second bearing 23, a worm wheel 24, an urging member 25, an elastic member 60, and a lid member 29. The worm shaft 21 includes a first end portion 21a and a second end portion 21b that are separated from each other in an axial direction X, and a tooth portion 21c that is an intermediate portion between the first end portion 21a and the second end portion 21b. The first end portion 21a is an axial end portion of the worm shaft 21 away from the electric motor 19. The second end portion 21b is the end portion of the worm shaft 21 closer to the electric motor 19.

The worm wheel 24 is coupled to the output shaft 9b of the column shaft 9 to be rotatable together with the output shaft 9b of the column shaft 9. The worm wheel 24 includes an annular core metal 24a, and an annular resin member 24b fitted onto the core metal 24a. The core metal 24a is connected to the output shaft 9b to be rotatable together with the output shaft 9b. The resin member 24b is fitted onto the core metal 24a. A tooth portion 24c is formed on an outer peripheral surface of the resin member 24b. The tooth portion 24c of the worm wheel 24 meshes with the tooth portion 21c of the worm shaft 21.

The worm shaft 21 is generally coaxially disposed with an output shaft 19a of the electric motor 19. The second end portion 21b of the worm shaft 21 and an end portion of the output shaft 19a of the electric motor 19 are coupled so as to be able to transmit a torque and pivot, via a power transmission joint 27. The power transmission joint 27 has a first rotation element 27a, a second rotation element 27b, and an intermediate element 27c. The first rotation element 27a is coupled to the second end portion 21b of the worm shaft 21 to be rotatable together with the second end portion 21b of the worm shaft 21. The second rotation element 27b is coupled to the output shaft 19a of the electric motor 19 to be rotatable together with the output shaft 19a of the electric motor 19. The intermediate element 27c is interposed between the first rotation element 27a and the second rotation element 27b, and transmits torque between the rotation elements 27a, 27b. The intermediate element 27c is formed of an elastic body, such as rubber.

The first bearing 22 is attached to the first end portion 21a of the worm shaft 21. The first end portion 21a of the worm shaft 21 is rotatably supported in the housing 20 via the first bearing 22. The second bearing 23 is attached to the second end portion 21b of the worm shaft 21. The second end portion 21b of the worm shaft 21 is rotatably supported in the housing 20 via the second bearing 23. The intermediate element 27c of the power transmission joint 27 elastically deforms. Thus, the worm shaft 21 is allowed to pivot about the bearing center of the second bearing 23 relative to the output shaft 19a of the electric motor 19.

The first bearing 22 is formed of a ball bearing, for example. The first bearing 22 includes an inner ring 40, an outer ring 41, and a plurality of rolling elements 42. The inner ring 40 of the first bearing 22 is fitted to a fitting recess 43 provided on the outer periphery of the first end portion 21a of the worm shaft 21. Thus, the inner ring 40 is rotatable together with the worm shaft 21. The inner ring 40 abuts on a positioning step part 44 provided on the outer periphery of the first end portion 21a of the worm shaft 21 in the axial direction. Thus, the movement of the inner ring 40 in the axial direction relative to the worm shaft 21 is regulated.

The second bearing 23 is formed of a ball bearing, for example. The second bearing 23 includes an inner ring 30, an outer ring 31, and a plurality of rolling elements 32. The inner ring 30 of the second bearing 23 is fitted to the second end portion 21b of the worm shaft 21 by clearance fit to be rotatable together with the second end portion 21b of the worm shaft 21. The outer ring 31 is held between a positioning step part 34 and a clamping member 35 in the axial direction X. The positioning step part 34 is provided in the housing 20 and the clamping member 35 is screw-fitted on to a screw portion provided on an inner surface 20a of the housing 20. Thus, movement of the outer ring 31 in the axial direction is regulated.

Figure 5:
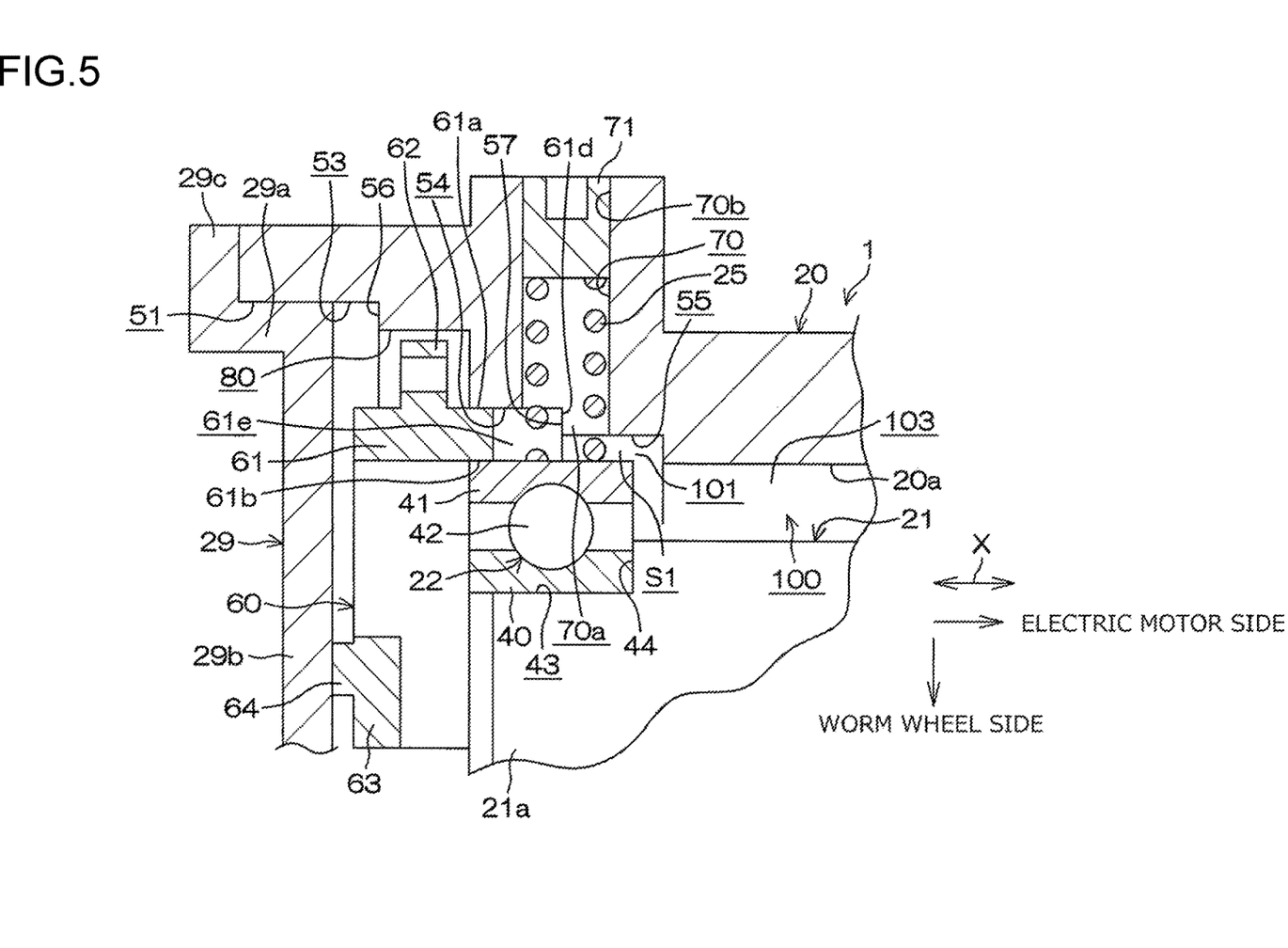
FIG. 5 is a sectional view of the surrounding structure of a first end portion of a worm shaft.
Figure 6:
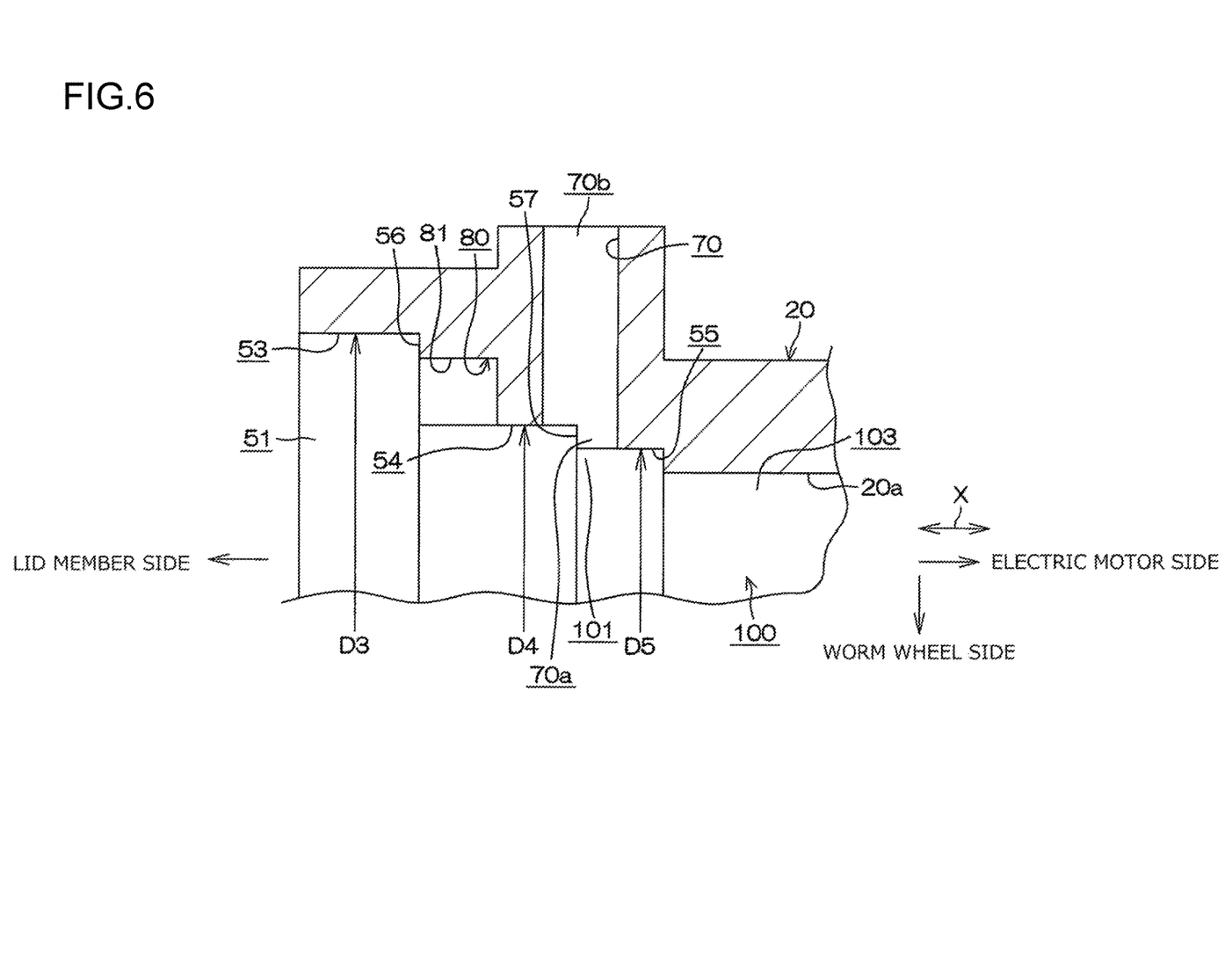
FIG. 6 is a sectional view of the first end housing portion of a housing.
Figure 7:
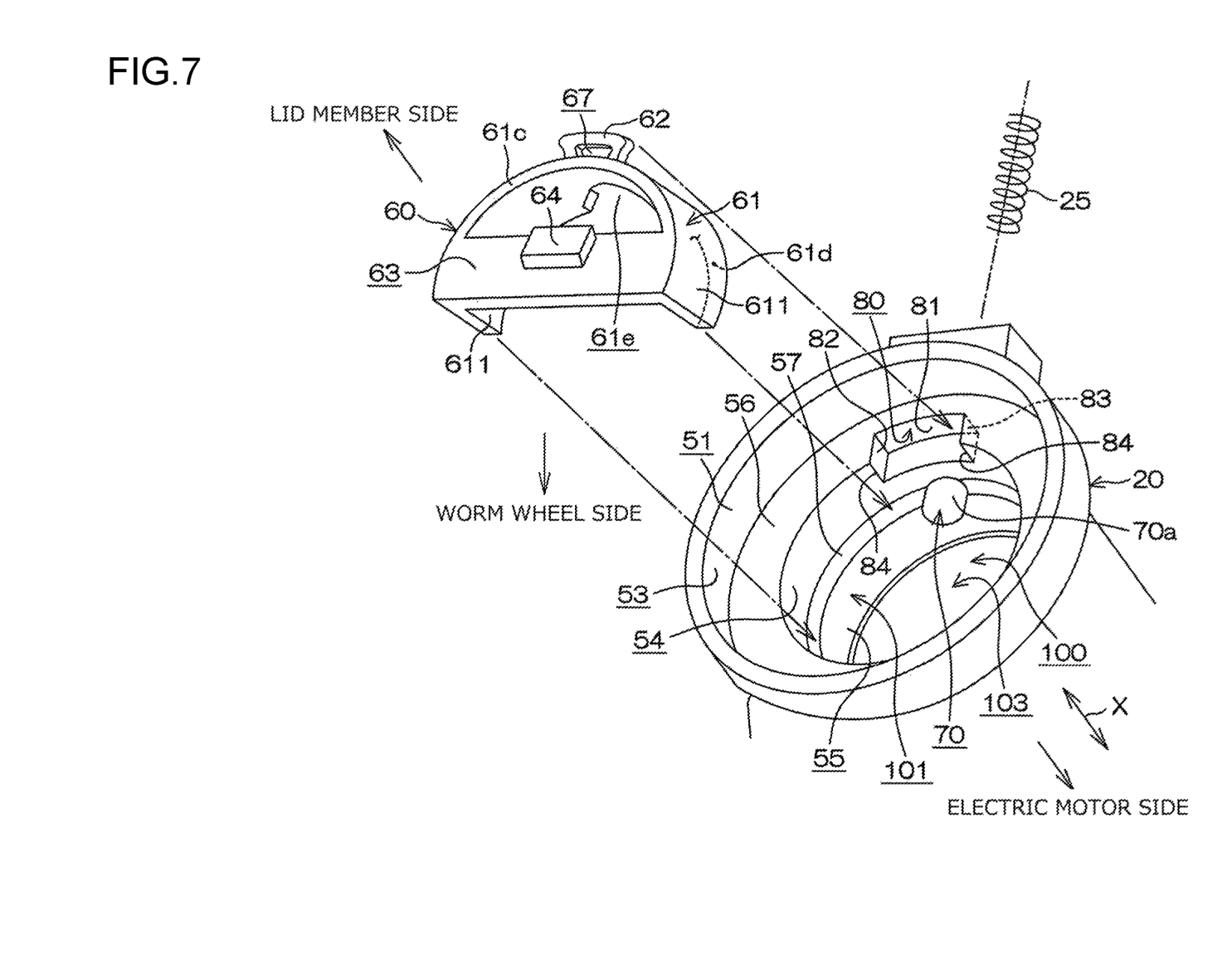
FIG. 7 is an exploded perspective view of the periphery a first opening of the housing, an urging member, and an elastic member.
Figure 8:
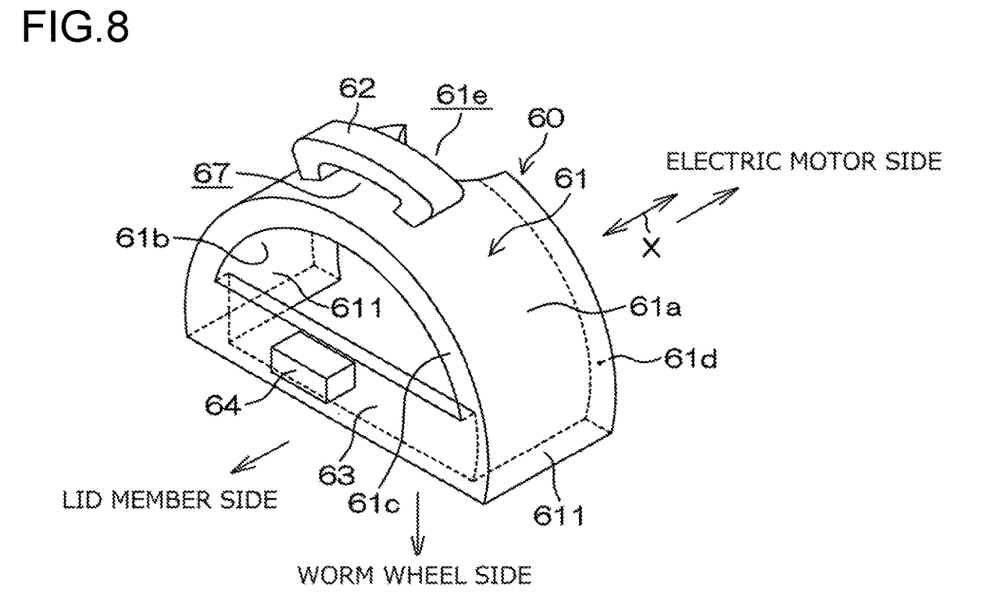
FIG. 8 is a perspective view of the elastic member in a different direction from FIG. 7.

As shown in FIG. 3, the urging member 25 is a compression coil spring, for example. The urging member 25 elastically urges the first end portion 21a of the worm shaft 21 toward the worm wheel 24 via the first bearing 22. The elastic member 60 is made of an elastic material such as rubber. FIG. 5 is a sectional view of the surrounding structure of the first end portion 21a of the worm shaft 21. FIG. 6 is a sectional view of a main part of the housing 20. FIG. 7 is an exploded perspective view of a main part of the housing 20, the urging member 25, and the elastic member 60. FIG. 8 is a perspective view of the elastic member 60 in a different direction from in FIG. 7.

First, the overall structure of the elastic member 60 will be described. As shown in FIGS. 4, 5, and 7, the elastic member 60 includes a buffer portion 61, a rotation regulation portion 62, a coupling portion 63, and an axial urging portion 64. As shown in FIG. 4, the buffer portion 61 has an arc shape, and is interposed between the inner surface 20a of the housing 20 and the outer peripheral surface of the outer ring 41 of the first bearing 22. The rotation regulation portion 62 extends from the buffer portion 61 outward in a radial direction R of the first bearing 22 (in the direction away from the worm wheel). The rotation regulation portion 62 is housed in a rotation regulation portion housing recess 80 provided in the inner surface 20a of the housing 20. As shown in FIG. 7, the coupling portion 63 couples a pair of arc end portions 611 of the buffer portion 61. As shown in FIG. 5, the coupling portion 63 is interposed between the lid member 29 and the first end portion 21a of the worm shaft 21. The axial urging portion 64 is a protrusion protruded towards the lid member 29 from the coupling portion 63 (see also FIG. 7).

As shown in FIG. 5, the lid member 29 includes a tubular portion 29a, an end wall portion 29b, and an annular flange portion 29c. The end wall portion 29b closes an end of the tubular portion 29a in the axial direction. The flange portion 29c extends in the radially outward direction of the tubular portion 29a from the other end of the tubular portion 29a in the axial direction. Referring to FIG. 2, the housing 20 has an internal space 28 that houses the worm shaft 21, the first bearing 22, the second bearing 23, the worm wheel 24, the urging member 25, the elastic member 60, and the lid member 29. The internal space 28 is defined by the inner surface 20a of the housing 20. The internal space 28 has a worm shaft housing space 100, a worm wheel housing space 110, a first opening 51, and a second opening 52.

The worm shaft 21 is housed in the worm shaft housing space 100. The worm wheel 24 is housed in the worm wheel housing space 110. The openings 51, 52 connect the worm shaft housing space 100 and the outside of the internal space 28. The worm shaft housing space 100 is a cylindrical space that extends in the axial direction X. The worm shaft housing space 100 has a first end housing portion 101, a second end housing portion 102, and a tooth housing portion 103.

As shown in FIGS. 5, 6, and 7, a lid member fitting recess 53, an elastic member fitting recess 54, and a bearing housing recess 55 are formed in this order from the first opening 51 side on the inner surface 20a of the housing 20. The lid member fitting recess 53 is an annular recess that defines the first opening 51 and into which the tubular portion 29a of the lid member 29 is fitted. The elastic member fitting recess 54 is an annular recess into which the buffer portion 61 of the elastic member 60 is fitted. The rotation regulation portion housing recess 80 is formed on a portion of the elastic member fitting recess 54 in the circumferential direction.

As shown in FIG. 5, the bearing housing recess 55 is an annular recess that surrounds the outer peripheral surface of the outer ring 41 of the first bearing 22 with a clearance interposed therebetween. The bearing housing recess 55 houses the first bearing 22 which is fitted onto the first end portion 21a of the worm shaft 21. As shown in FIG. 6, an inner diameter D4 of the elastic member fitting recess 54 is smaller than an inner diameter D3 of the lid member fitting recess 53, and is larger than an inner diameter D5 of the bearing housing recess 55 (D3>D4>D5).

An annular first step portion 56 that faces the first opening 51 side is formed on the boundary between the lid member fitting recess 53 and the elastic member fitting recess 54. The first step portion 56 faces the end wall portion 29b of the lid member 29. An annular second step portion 57 that faces the first opening 51 side is formed on the boundary between the elastic member fitting recess 54 and the bearing housing recess 55. As shown in FIG. 5, the second step portion 57 abuts on an edge 61d, on the electric motor side, of the buffer portion 61 of the elastic member 60 that is fitted to the elastic member fitting recess 54. Then, the second step portion 57 positions the buffer portion 61 in the axial direction X relative to the housing 20.

As shown in FIGS. 5 and 6, the first end housing portion 101 of the worm shaft housing space 100 is defined by the elastic member fitting recess 54 provided on the inner surface 20a of the housing 20, and the bearing housing recess 55. The first end housing portion 101 is an end of the worm shaft housing space 100 in the axial direction X. The first end housing portion 101 is in communication with the outside of the internal space 28 via the first opening 51.

Referring to FIG. 2, the first end housing portion 101 functions as a bearing moving hole in which the first bearing 22 moves in the direction that a core-to-core distance D1 of the worm shaft 21 and the worm wheel 24 increases and decreases (see also FIG. 3). As shown in FIG. 2, the core-to-core distance D1 is the distance between a central axis C1 of the worm shaft 21 and a central axis C2 of the worm wheel 24. As shown in FIGS. 5 and 6, an urging member housing hole 70 that opens to the side that does not face the worm wheel 24 relative to the first bearing 22 is formed on the inner surface 20a of the housing 20. The urging member 25 is housed in the urging member housing hole 70. An inner opening 70a that opens to the first end housing portion 101 and an outer opening 70b that opens to the outside of the internal space 28 are formed in the urging member housing hole 70. The outer opening 70b is closed by a closing member 71. The urging member 25 is interposed between the closing member 71 and the outer peripheral surface of the outer ring 41 of the first bearing 22, and elastically urges the first end portion 21a of the worm shaft 21 toward the worm wheel 24 via the first bearing 22.

Figure 9:
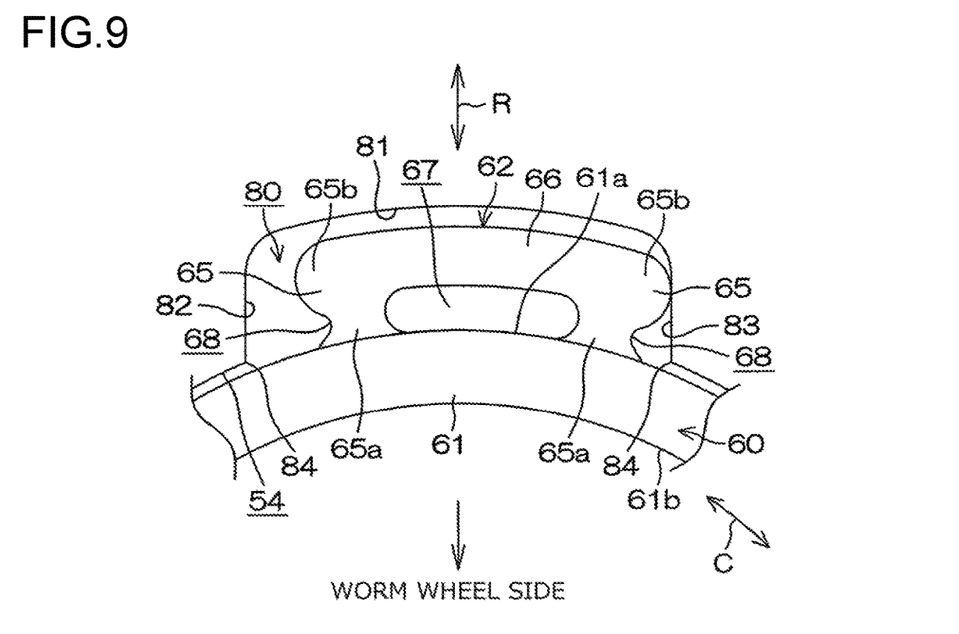
FIG. 9 is an explanatory diagram of the state of rotation regulation by a rotation regulation portion.

As shown in FIGS. 4 and 5, and FIG. 9 that is an explanatory diagram, the rotation regulation portion housing recess 80 that houses the rotation regulation portion 62 of the elastic member 60 is formed in the elastic member fitting recess 54. As shown in FIG. 9, the rotation regulation portion housing recess 80 is defined by a bottom portion 81 that is depressed from the elastic member fitting recess 54, and a pair of inner wall surfaces 82, 83 that are spaced away from each other in the circumferential direction. Inlet corner portions 84 of the rotation regulation portion housing recess 80 are formed by the crossing of the inner wall surfaces 82, 83 and the elastic member fitting recess 54.

Next, the structure of the elastic member 60 will be described. As shown in FIG. 4, the buffer portion 61 of the elastic member 60 is interposed between the inner surface 20a of the housing 20 and the outer peripheral surface of the outer ring 41 of the first bearing 22. Additionally, the buffer portion 61 is formed by an arc-shaped plate that opens to the worm wheel 24 side. As shown in FIGS. 7 and 8, the buffer portion 61 includes an outer surface 61a and an inner surface 61b both formed of an arc-shaped surface, an edge 61c on the lid member 29 side, and the edge 61d on the electric motor 19 side. As shown in FIG. 5, the outer surface 61a of the buffer portion 61 is fitted to the elastic member fitting recess 54. The inner surface 61b of the buffer portion 61 is fitted to the outer peripheral surface of the outer ring 41 of the first bearing 22.

A clearance may be interposed between the inner surface 61b of the buffer portion 61 and the outer peripheral surface of the outer ring 41 of the first bearing 22. The outer surface 61a of the buffer portion 61 is fitted to the elastic member fitting recess 54 of the inner surface 20a of the housing 20. The inner surface 61b of the buffer portion 61 is fitted to the outer peripheral surface of the outer ring 41 of the first bearing 22. In this state, when the buffer portion 61 is in a non-compressed state, a clearance S1 is provided between the bearing housing recess 55 and the outer peripheral surface of the outer ring 41 of the first bearing 22.

The buffer portion 61 is elastically compressed when the first bearing 22 is moved in the direction away from the worm wheel, by a load acting on the first bearing 22 from the worm wheel via the worm shaft 21. The buffer portion 61 attenuates the movement of the first bearing 22 by elastic resiliency. When the load acting on the first bearing 22 is excessive, the outer peripheral surface of the outer ring 41 of the first bearing 22 and the bearing housing recess 55 abut against each other, and the clearance S1 becomes zero. Thus, the durability of the buffer portion 61 is ensured, by the amount of compression of the buffer portion 61 being limited to the amount of the clearance S1 or lower.

As shown in FIGS. 5 and 8, a semicircular clearance groove 61e for example, is formed in the buffer portion 61. The clearance groove 61e extends through the outer surface 61a and the inner surface 61b to open to the edge 61d on the electric motor 19 side, in order to avoid interference with the urging member 25. As shown in FIG. 9, the rotation regulation portion 62 is extended radially outward (in the direction away from the worm wheel) from the outer surface 61a of the buffer portion 61. The rotation regulation portion 62 has a generally rectangular shape that extends in a circumferential direction C and has a prescribed thickness in the axial direction X (not shown in FIG. 9, the direction orthogonal to the sheet on which FIG. 9 is drawn). The rotation regulation portion 62 housed in the rotation regulation portion housing recess 80 engages with the inner wall surfaces 82, 83 of the rotation regulation portion housing recess 80. Thus, the rotation of the buffer portion 61 in the circumferential direction C of the first bearing 22 is regulated.

The rotation regulation portion 62 includes a pair of engagement portions 65, a bridge portion 66, and a hollow portion 67. Each of the engagement portions 65 is a columnar portion that has a base end portion 65a and a distal end 65b. The base end portion 65a is connected to the buffer portion 61. The distal end 65b is spaced from the base end portion 65a in the direction away from the worm wheel. The engagement portions 65 are spaced away from each other in the circumferential direction C, and can be engaged with the inner wall surfaces 82, 83 of the rotation regulation portion housing recess 80. Specifically, either one of the engagement portions 65 is engaged with the corresponding one of the inner wall surfaces 82, 83 depending on the direction of the rotation of the buffer portion 61. Thus, rotation of the buffer portion 61 is regulated. A clearance portion 68 that has a recessed curved shape for example, is formed in the base end portions 65a of each of the engagement portions 65. The clearance portion 68 suppresses interference of the base end portion 65a and the corresponding inlet corner portion 84 of the rotation regulation portion housing recess 80, during rotation regulation of the buffer portion 61.

The bridge portion 66 extends between the distal ends 65b of the engagement portions 65, and connects the distal ends 65b together. The hollow portion 67 is interposed between the engagement portions 65 in the circumferential direction C. The hollow portion 67 is interposed between the bridge portion 66 and the outer surface 61a of the buffer portion 61 in the radial direction R. Thus, the hollow portion 67 is formed of a though hole (see also FIG. 7) that extends through in the direction parallel to the axial direction X of the worm shaft 21, between the engagement portions 65.

As shown in FIGS. 7 and 8, the coupling portion 63 has a generally rectangular plate shape, and couples the edges, on the lid member 29 side, in the arc end portions 611 of the arc-shaped buffer portion 61. As shown in FIG. 5, the coupling portion 63 faces the end face of the first end portion 21a of the worm shaft 21 and the end wall portion 29b of the lid member 29. As shown in FIG. 8, the coupling portion 63 and the arc end portions 611 are assembled, and a groove shape is formed. When installing the elastic member 60 in the housing 20, during the assembly of the worm reducer 1 the elastic member 60 can be easily installed by gripping the coupling portion 63. In particular, the coupling portion 63 can be gripped by a robot hand during assembly, and is thus suitable for automatic assembly.

The axial urging portion 64 is formed of a protrusion that protrudes from the surface of the coupling portion 63 on the lid member 29 side. As shown in FIG. 5, the axial urging portion 64 elastically abuts on the end wall portion 29b of the lid member 29. The contact reaction force acts to press the edge 61d of the buffer portion 61 on the electric motor 19 side onto the second step portion 57 of the inner surface 20a of the housing 20. Thus, holding of the axial position of the buffer portion 61 with respect to the housing 20 becomes stable.

Referring to FIG. 2, the second end portion 21b, the second bearing 23, and the power transmission joint 27 are housed in the second end housing portion 102. The second bearing 23 is attached to the second end portion 21b. The power transmission joint 27 is coupled to the second end portion 21b. The second end housing portion 102 is the other end of the worm shaft housing space 100 in the axial direction X. The second opening 52 is formed in the other end of the housing 20 in the axial direction X. The second end housing portion 102 is in communication with the outside of the internal space 28 via the second opening 52.

The tooth portion 21c is housed in the tooth housing portion 103. The tooth housing portion 103 is in communication with the worm wheel housing space 110. In the embodiment, as shown in FIG. 9, the rotation regulation portion 62 engages with the inner wall surface 82 or 83 of the rotation regulation portion housing recess 80 of the housing 20 and deforms, during rotation regulation of the elastic member 60 by the rotation regulation portion 62. The hollow portion 67 is provided in the rotation regulation portion 62, and thus the rotation regulation portion 62 is easily deformed. Therefore, it is possible to suppress deformation of the buffer portion 61 due to transmission of the deformation load of the rotation regulation portion 62 to the buffer portion 61. The buffer portion 61 can attenuate the movement of the first bearing 22 in the radial direction R, without being influenced by the deformation of the rotation regulation portion 62. Thus, it is possible to suppress the striking noise due to contact between the first bearing 22 and the housing 20, and achieve the low-noise worm reducer 1.

When the rotation regulation portion 62 regulates rotation of the elastic member 60, the engagement portions 65 of the rotation regulation portion 62 are easily deformed toward the through hole (hollow portion 67) interposed between the engagement portions 65. Thus, it is possible to effectively suppress deformation load of the rotation regulation portion 62 from being applied to the buffer portion 61. The clearance portions 68 provided on the rotation regulation portion 62 suppress interference of the rotation regulation portion 62 and the inlet corner portions 84 of the rotation regulation portion housing recess 80. Thus, the durability of the rotation regulation portion 62 is improved.

Figure 10A:
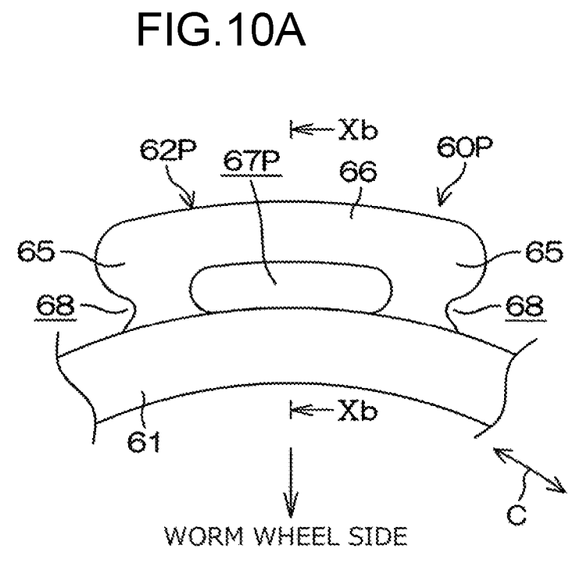
FIG. 10A is a schematic view of an elastic member in the first variation.
Figure 10B:
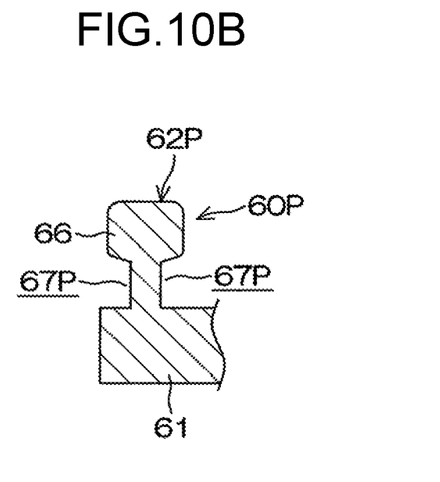
FIG. 10B is a cross section taken along line Xb-Xb in FIG. 10A.

By lowering the noise of the worm reducer 1, the low-noise electric power steering system 2 can be achieved. The invention is not limited to the above-described embodiment. For example, in the embodiment shown in FIG. 9, the hollow portion 67 formed of a through hole is provided in the rotation regulation portion 62 of the elastic member 60. However, in a rotation regulation portion 62P of an elastic member 60P, a hollow portion 67P formed of a non-through hole may be provided, as of the first variation shown in FIG. 10A and FIG. 10B which is a sectional view taken along line Xb-Xb in FIG. 10A. In the first variation, the durability of the engagement portions 65 is improved.

Figure 11:
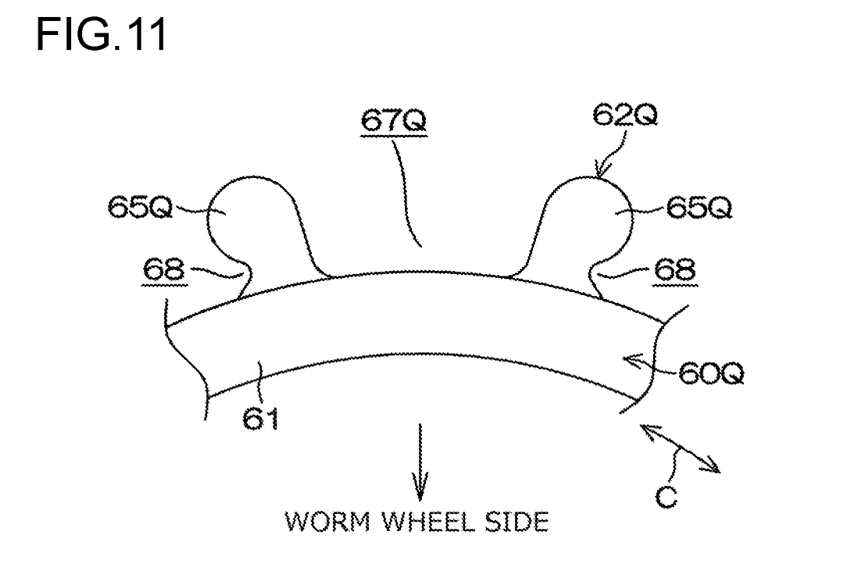
FIG. 11 is a schematic view of an elastic member in the second variation.

In the embodiment shown in FIG. 9, the distal ends 65b of the columnar engagement portions 65 of the elastic member 60 are connected via the bridge portion 66. However, as of the second variation shown in FIG. 11, a rotation regulation portion 62Q of an elastic member 60Q may be formed of a pair of engagement portions 65Q that are independent of each other. A hollow portion 67Q formed of a through hole is opened to the side opposite to the buffer portion 61. In the second variation, the engagement portions 65Q are more easily deformed and transmission of load to the buffer portion 61 is further suppressed, during rotation regulation of the elastic member 60Q by the rotation regulation portion 62Q.

In addition, various modifications can be made to the invention within the scope of the claims.

What is claimed is:

1. A worm reducer comprising:
a worm shaft that has a first end portion and a second end portion in an axial direction of the worm shaft, the second end portion coupled to an electric motor;
a worm wheel that meshes with the worm shaft;
a bearing that supports the first end portion of the worm shaft;
a housing including an inner surface having a portion that defines a first end housing portion that houses the first end portion of the worm shaft and the bearing, the portion of the inner surface provided with a recess having a pair of inner wall surfaces that face each other in a circumferential direction of the bearing;
an urging member that urges the first end portion of the worm shaft toward the worm wheel via the bearing; and
an elastic member including an arc-shaped buffer portion that is interposed between the portion of the inner surface of the housing and an outer peripheral surface of the bearing and that opens toward the worm wheel, and a rotation regulation portion that extends from the buffer portion and is housed in the recess and that regulates the buffer portion from rotating in the circumferential direction by engaging with the inner wall surfaces, wherein
the rotation regulation portion includes a hollow portion which suppresses load transmission from the rotation regulation portion to the buffer portion,
the rotation regulation portion includes a pair of engagement portions that are spaced away from each other in the circumferential direction of the bearing and each engage with a corresponding one of the pair of inner wall surfaces of the recess of the housing, and
the hollow portion is interposed between the engagement portions, and is formed of a through hole or a non-through hole that has a depth in a direction parallel to the axial direction of the warm shaft.

2. The worm reducer according to claim 1, wherein
an inlet corner portion of the recess is formed of each of the inner wall surfaces and the portion of the inner surface of the housing, and
the rotation regulation portion has a clearance portion that suppresses interference with the inlet corner portion.

3. An electric power steering system, wherein
power from the electric motor is transmitted to a steering shaft via the worm reducer according to claim 2.

4. An electric power steering system, wherein
power from the electric motor is transmitted to a steering shaft via the worm reducer according to claim 1.

5. A worm reducer comprising:
a worm shaft that has a first end portion and a second end portion in an axial direction of the worm shaft, the second end portion coupled to an electric motor;
a worm wheel that meshes with the worm shaft;
a bearing that supports the first end portion of the worm shaft;
a housing including an inner surface having a portion that defines a first end housing portion that houses the first end portion of the worm shaft and the bearing, the portion of the inner surface provided with a recess having a pair of inner wall surfaces that face each other in a circumferential direction of the bearing;
an urging member that urges the first end portion of the worm shaft toward the worm wheel via the bearing; and
an elastic member including an arc-shaped buffer portion that is interposed between the portion of the inner surface of the housing and an outer peripheral surface of the bearing and that opens toward the worm wheel, and a rotation regulation portion that extends from the buffer portion and is housed in the recess and that regulates the buffer portion from rotating in the circumferential direction by engaging with the inner wall surfaces, wherein
the rotation regulation portion includes a hollow portion which suppresses load transmission from the rotation regulation portion to the buffer portion,
an inlet corner portion of the recess is formed of each of the inner wall surfaces and the portion of the inner surface of the housing, and the rotation regulation portion has a clearance portion that suppresses interference with the inlet corner portion.

6. An electric power steering system, wherein power from the electric motor is transmitted to a steering shaft via the worm reducer according to claim 5.

\* \* \* \* \*